United States Defensive Publication [19] (H) [11] T999,002

Twiggs et al. [43] Oct. 7, 1980

[54] APPLICATION OF POLYMERIC POWDERS TO A SUBSTRATE

[76] Inventors: Henry C. Twiggs, 277 Lakeview Cir., Kingsport, Tenn. 37663; James L. Suggs, Rte. 12, Greeneville, Tenn. 37743; Dan F. Buck, 816 Liberty Dr., Kingsport, Tenn. 37663

[21] Appl. No.: 81,233

[22] Filed: Oct. 2, 1979

[51] Int. Cl.[3] ..... B05D 3/02

[52] U.S. Cl. ..... 427/385.5; 427/393.5

[57] ABSTRACT

The present invention provides a method for coating a substrate with a thermoplastic polymeric powder, especially polyester powder, by forming an emulsion containing fine particles of such powder, applying the emulsion to the substrate, and heating the coated substrate to a temperature sufficiently high to evaporate the liquid from the emulsion and thermally bond the particles to the substrate. The emulsifying agents are fatty acid esters of glycerol.

7 Claims, No Sheets Drawing,

6 Pages Specification

The file of this unexamined application may be inspected and copies thereof may be purchased (849 O.G. 1221, Apr. 9, 1968).